April 22, 1924.
E. THEOBALD
1,491,438
MACHINE FOR CUTTING ROLLS AND BREAD LOAVES
Filed Nov. 3, 1923  4 Sheets-Sheet 1
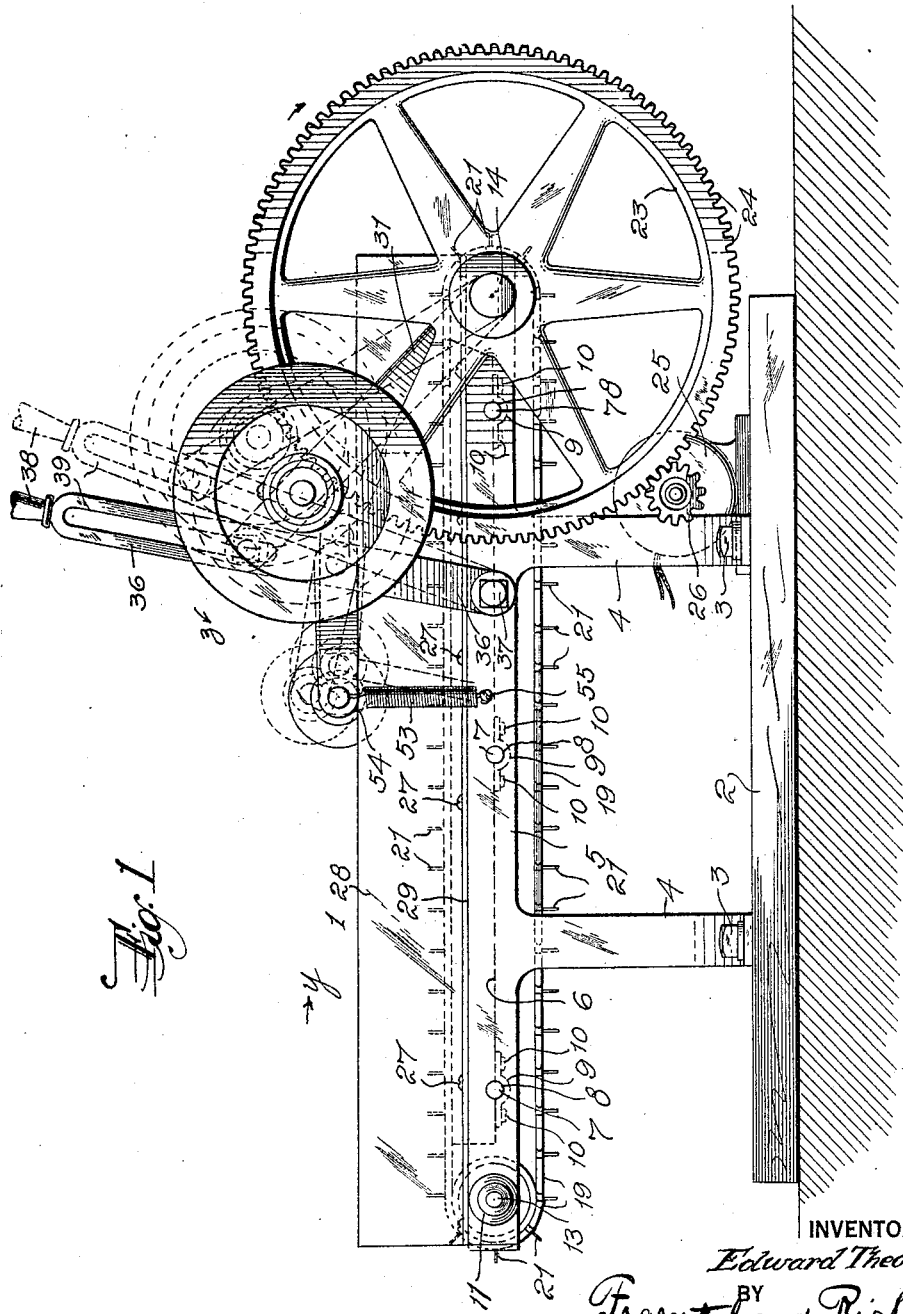
INVENTOR:
Edward Theobald
BY
Fraentzel and Richards
ATTORNEYS

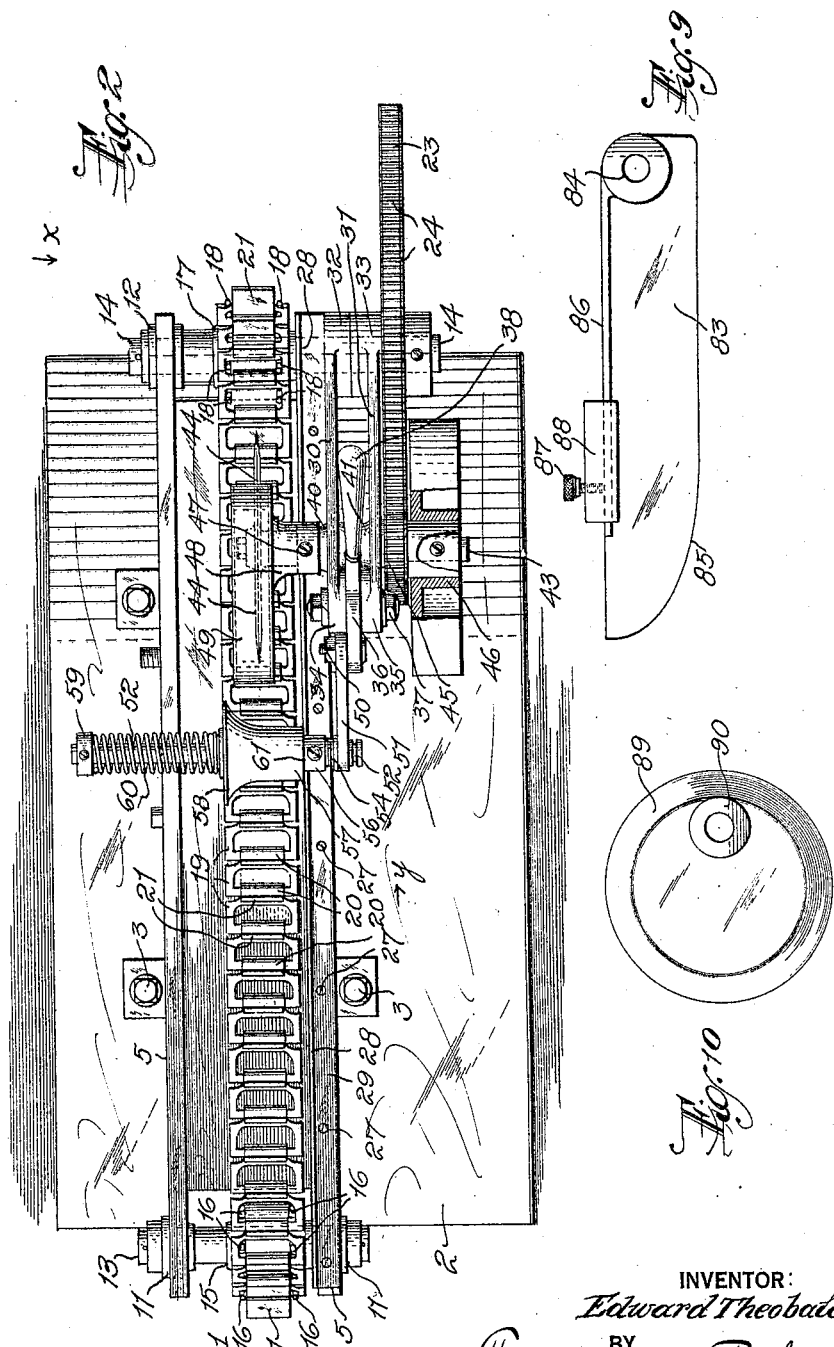

April 22, 1924.
E. THEOBALD
1,491,438
MACHINE FOR CUTTING ROLLS AND BREAD LOAVES
Filed Nov. 3, 1923
4 Sheets-Sheet 3
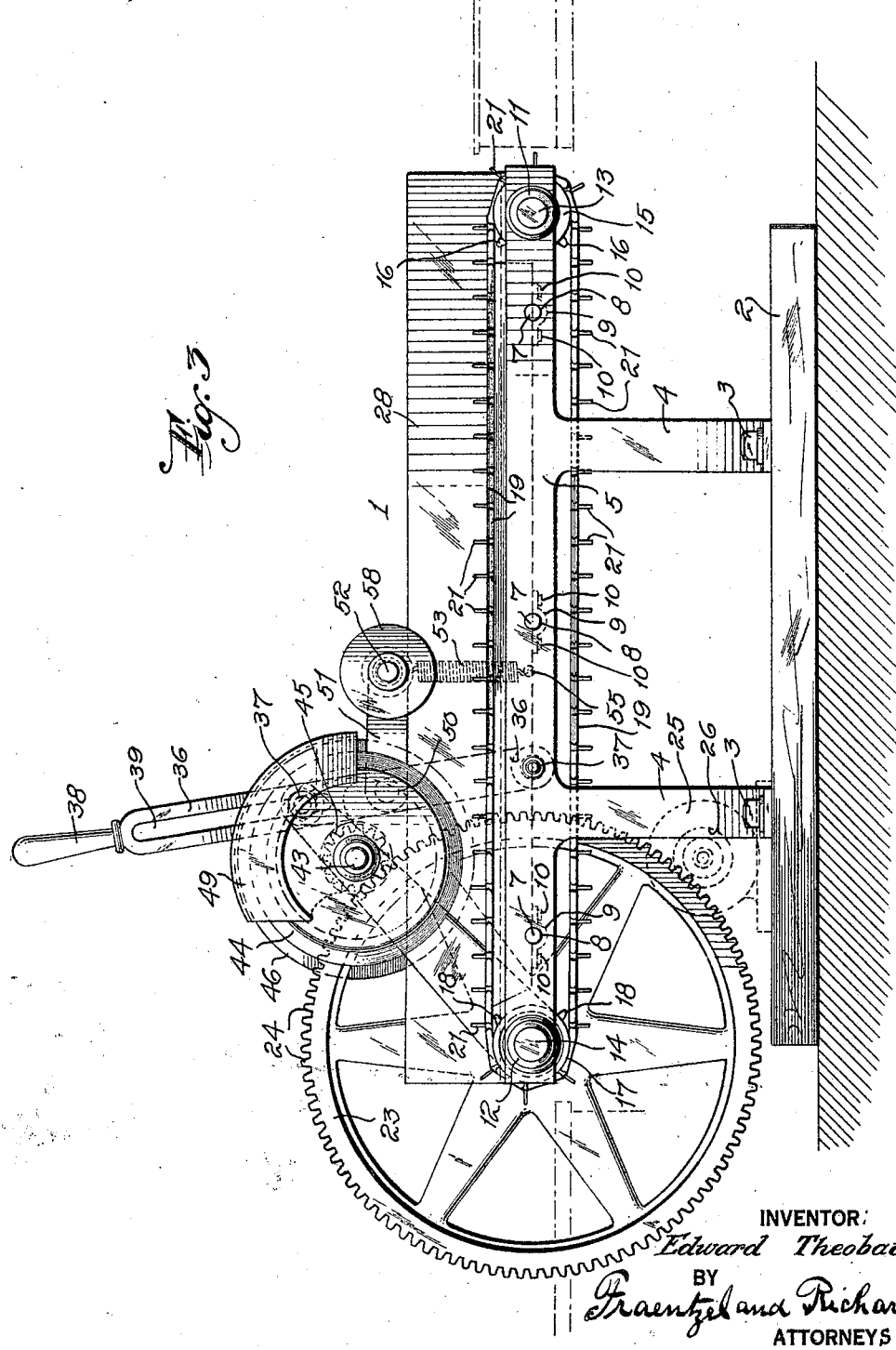

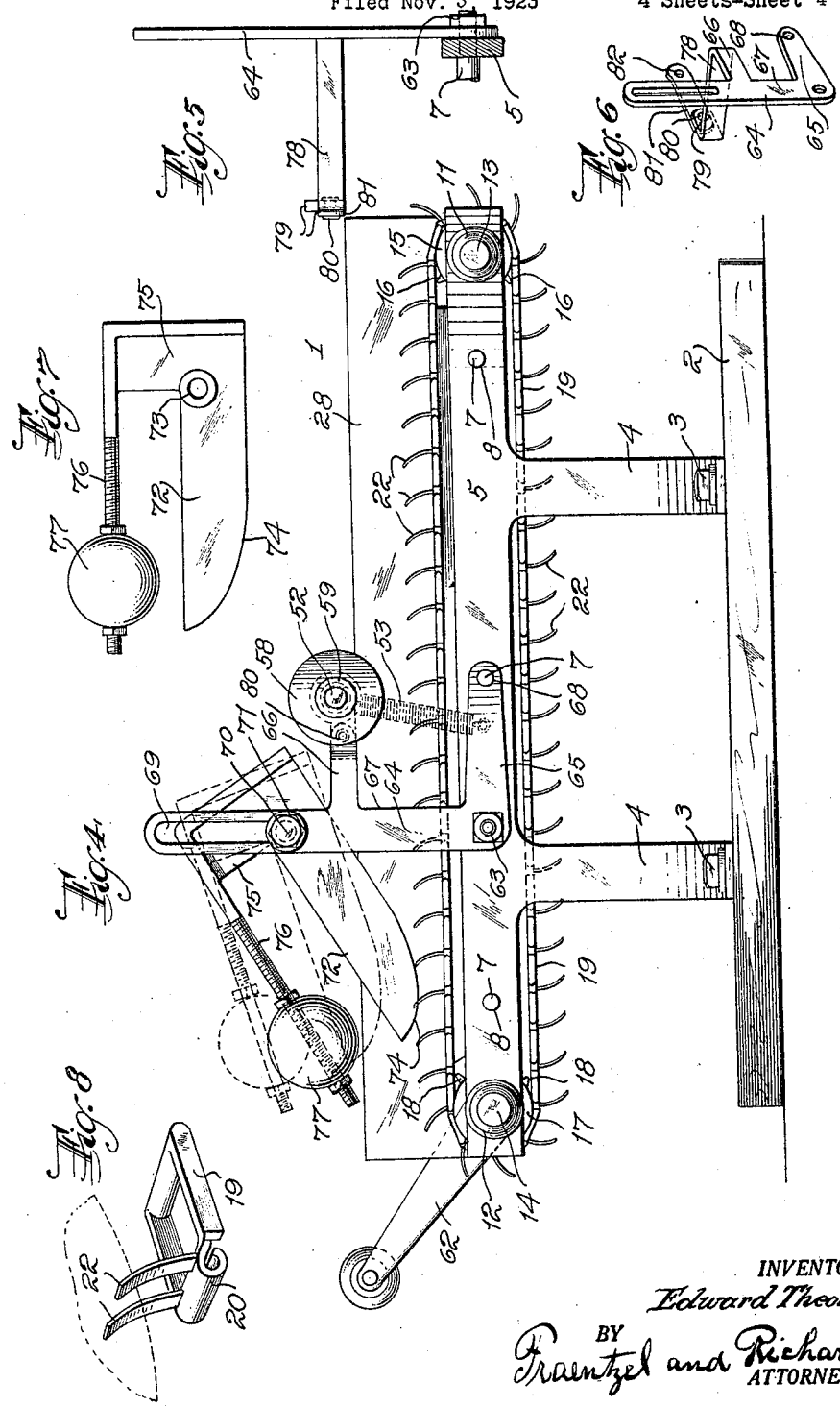

Patented Apr. 22, 1924.

1,491,438

UNITED STATES PATENT OFFICE.

EDWARD THEOBALD, OF IRVINGTON, NEW JERSEY.

MACHINE FOR CUTTING ROLLS AND BREAD LOAVES.

Application filed November 3, 1923. Serial No. 672,527.

*To all whom it may concern:*

Be it known that I, EDWARD THEOBALD, a citizen of the United States, residing at Irvington, in the county of Essex and State of New Jersey, have invented certain new and useful Improvements in Machines for Cutting Rolls and Bread Loaves; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in cutting or severing machines; and, the present invention has reference, more particularly, to a novel and simply constructed, as well as an efficiently operating apparatus or machine, the mechanism of which operates to feed rolls or small loaves of bread beneath a cutter, for partially cutting or severing such rolls or loaves for the reception between the separated portions of the rolls or loaves of frankfurters, sausages, and the like.

The present invention has for its principal object to provide a cutting or severing apparatus or machine of the general character hereinafter set forth, and for the purposes above stated, into and through which the rolls or small loaves of bread, such as are used for making sandwiches, are rapidly fed beneath a cutter, so as to be partially cut or severed, and discharged from the apparatus or machine, ready for the reception between the separated parts, of frankfurters, sausages, and the like.

Other objects of this invention not at this time more particularly enumerated will be clearly understood from the following detailed description of the present invention.

With the various objects of the said invention in view, the same consists, primarily, in the novel cutting or severing machine hereinafter set forth; and, the said invention consists, furthermore, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is illustrated in the accompanying drawings, in which:—

Figure 1 is a side elevation of a cutting or severing machine, showing one embodiment of the principles of the present invention; Figure 2 is a top or plan view of the same; and Figure 3 is an elevation of the other side of the machine, looking in the direction of the arrow $x$ in said Figure 2.

Figure 4 is a side elevation of a cutting or severing machine, embodying the principles of the present invention, but illustrating a modified cutter employed in connection therewith. Figure 5 is an edge view, and Figure 6 is a perspective view of the form of knife or cutter employed with the machine represented in said Figure 4. Figure 7 is a side view of the cutter shown in said Figure 4; and Figure 8 is a perspective view of one of the link-connections of a feeding belt or conveyor employed with the constructions of cutting or severing machines represented in said Figures 1, 2, 3 and 4.

Figures 9 and 10 are side views of two other forms of knives or cutters adapted for use with the cutting or severing machines represented, respectively, in Figure 4, and in said Figures 1, 2 and 3.

Similar characters of reference are employed in the several figures of the drawings, to indicate corresponding parts.

Referring now more particularly to Figures 1, 2 and 3 of the drawings, the reference-character 1 indicates one form of complete cutting or severing machine made according to and embodying the principles of the present invention, the same comprising a suitable base or bed-plate 2, upon which are suitably secured by means of bolts 3, or otherwise, standards or legs, as 4, of a pair of frames, in the form of longitudinally extending members 5, substantially as shown. These frames are suitably spaced apart, so as to receive between them a supporting plate 6. This plate is mounted in its position between the said frames 5, upon suitably disposed and laterally extending supporting rods or bars 7, having their end-portions fixed in suitably formed holes or perforations 8 in the said members 5, the said plate 6 being secured against movement upon said rods or bars 7 by an arrangement of loops 9 which embrace the said rods or bars 7 and are secured upon the lower face of the plate 6 by means of screws or bolts, as 10.

Of course it will be understood that the said plate 6 may be arranged between the two supporting frames 5 in any other suitable manner, and the various parts may be secured in their assembled relation by suitable fastening and securing means, other from the rods or bars 7 and the loops 9 hereinabove described, and shown in Figures 1 and 3 of the drawings.

At their respective end-portions, the said members 5 are provided with bearings 11 and 12, in which are respectively journalled suitable shafts 13 and 14. The shaft 13 carries a hub 15 provided with peripheral lugs 16, the shaft 14 being also provided with a hub 17 having an arrangement of peripheral lugs 18. Mounted over the hubs 15 and 17 is a belt or conveyor, the said belt or conveyor consisting of a series of links 19 pivotally connected by means of loops or hinge-like members 20, which loops or members are provided with outwardly extending projections 21, as shown in said Figures 1, 2 and 3 of the drawings, or with a pair of curved fingers 22, as represented in Figure 8. Movement of the said conveyor in the direction of arrows $y$ shown in Figures 1 and 2 of the drawings is produced by the lugs 16 and 18 entering the links 19, as will be understood, when the shaft or spindle 14 is rotated by the mechanism to be presently described. The means herein shown for rotating the shaft 14 is a suitable wheel 23, mounted upon the said shaft, the said wheel being provided upon its periphery with gear-teeth 24, in mesh with the teeth of the pinion 26 of an electric motor 25. Other mechanism for rotating the shaft 14 may however be employed, as will be evident. Suitably mounted upon the upper face-portion of one of the frame-members 5, as shown more particularly in Figure 2 of the drawings, by means of screws 27, or other suitable fastening means, is the flanged portion 29 of a vertical and longitudinally extending wall or plate 28, providing along one of the longitudinal edge-portions of the supporting plate 6, a guiding member for properly maintaining the rolls or small bread-loaves in position upon the belt or conveyor. Pivotally mounted upon a portion of the shaft 14, between the hub of the wheel 23 and the bearing 12, are hubs 32 and 33 of a pair of arms 30 and 31, the said arms being respectively provided at their other ends with hubs 34 and 35, between which is disposed a portion of an upwardly extending manipulating lever 36, pivotally attached at its lower end, as at 37, to the side of the frame-member 5. At its upper end, the said lever 36 has a handle or grip-member 38, for manipulation of the same, the lever being also provided with an elongated opening or slot 39, for the reception of a bolt 40, which also extends into and through the hubs 34 and 35 of the arms 30 and 31 for operatively and adjustably connecting the said arms 30 and 31 with the manipulating lever 36. The said arms 30 and 31 are also, respectively, provided with other hubs 41 and 42, in which is rotatably mounted a shaft or spindle 43, carrying upon its one end-portion, in alinement vertically with the central portion of the link-belt or conveyor, a circular knife or cutter 44.

Upon its other end-portion, projecting beyond the hub 42, the said shaft or spindle 43 has suitably mounted thereon a pinion 45, which also meshes with the teeth of the wheel 23, for actuating the said shaft or spindle 43, as will be evident. A suitable balance-wheel 46 may also be suitably mounted and secured upon the shaft or spindle 43, as shown. Suitably secured in a fixed position upon the hub 40 by means of a screw 47, or in any other suitable manner, is the hub-portion 48 of a guard 49, suitably enclosing a portion of the cutting edge of the knife or cutter 44 to safeguard the operator from accidentally coming in contact with the rapidly revolving knife or cutter. Also oscillatorily mounted upon a pin or stud 50, extending at a suitable location from the side of the manipulating lever 36 is an arm 51, with the free end-portion of which is suitably connected a stem or rod 52, extending laterally above the vertical wall or plate 28 and the conveyor and supporting plate 6, substantially as shown. At its end-portion, nearest the arm 51, the stem or rod 52 has connected therewith the looped end-portion 54 of a coiled spring 53, said spring extending in a downward direction, and being secured at its lower end, by means of a screw 55, or otherwise, to the side of the frame-member 5. Upon said stem or rod 52 is a collar, as 56, adapted to contact with the upper edge of the vertical wall or plate 28, and loosely and rotatably disposed upon the stem or rod 52, directly above the link-belt or conveyor, is a guiding spool, as 57, formed at one end with an outwardly flaring portion 58. Encircling that portion of the stem or rod 52, between said outwardly flaring portion of the spool and a collar 59, or other retaining means adjustably secured upon the stem or rod 52, is a coiled spring 60, the purpose of which is self-evident.

Having in the foregoing described my preferred form of cutting or severing machine, I will now briefly set forth the manner of its operation for partially cutting or severing rolls or short bread-loaves for the purposes previously stated.

After the electric motor 25 has been started, the pinion 26, gear-wheel 23 and the pinion 45 cause the shaft or spindle 43 to revolve, so that the cutter or knife 44 will rotate in the direction of the arrow *z* indicated in Figure 1 of the drawings, the link-belt or conveyor being also set in operation and moving in the direction of the arrow *y* in said Figure 1. The rolls or small loaves of bread are now successively placed upon the belt or conveyor, preferably by forcing them over the ends of the projections 21 or the fingers 22, being fed by the belt or conveyor and guided by the vertical wall or plate 28 beneath the guiding-spool 58 directly in contact with the cutting edge of the rotating cutter or knife 44, and the cutter or knife being forced down into the moving rolls or loaves by the proper manipulation of the lever 36.

The depth of the cut is regulated by the proper adjustment made between the arms 30 and 31 and the lever 36, the movement of the said lever 36 and the consequent depth of the cut made by the cutter or knife, so as to prevent complete separation of the halves of the rolls or loaves, being limited by contact of the sleeve 56 with the upper edge of the guide-wall or plate 28, as will be fully understood. Furthermore, the action of the spring 60 is such, that it normally forces the portion 61 of the spool 57 against the said wall or plate 28, and, as the roll or loaf passes beneath the spool, between the face of the guide-wall or plate 28 and the outwardly flaring portion 58 of the spool, these members serve to maintain the proper positioning of the roll or loaf, during the cutting or severing operation, while passing against the cutting edge of the knife or cutter.

Instead of providing the cutting or severing machine or apparatus with the hereinabove described rotary cutter or knife and the mechanism for operating the same, a cutting or severing machine of the construction shown in Figure 4 of the drawings may be employed.

In this machine or apparatus the link-belt or conveyor-operating shaft 14 is actuated by a hand-crank 62, suitably secured upon an end of said shaft, although it will be understood that any other suitable means may be employed for producing rotary motion of said shaft.

At a suitable point there may be secured by means of a bolt 63, or other suitable means, an upwardly extending post 64, provided with suitable arms 65 and 66 extending angularly from the edge 67 of said post, substantially as shown in Figures 4 and 6 of the drawings. The said arm 65, at its forward end-portion is made with a hole or perforation 68 for fitting the end-portion of said arm over the projecting end-portion of one of the rods or bars 7, the purpose being to more securely and rigidly maintain the said post 64 in its proper position. In its upper portion, the post 64 is made with an elongated opening or slot 69 in which is arranged and adapted to be adjustably secured by means of a tightening nut 71, or otherwise, a laterally extending rod 70. Rigidly secured upon the rod 70, is the hub-portion 73 of a blade 72, formed with a cutting edge 74, said blade having an upwardly extending projection 75, and a forwardly and screw-threaded rod-like member, as 76, upon which is adjustably disposed a suitable weight or counterbalance 77. The tightening nut 71 permits of adjustments of this form of cutter both vertically and angularly with relation to the post 64 and the link-belt or conveyor, according to the depth to which the roll or bread-loaf is to be cut. In connection with this mechanism, the arm 66 may be angularly made, as at 78 and 79, see Figure 6, the portion 79 having pivotally connected therewith, as at 80, an arm 81, to which is secured, at its perforated end 82, and extends laterally therefrom over and above the conveyor, a rod and spring-controlled spool such as is described in connection with the form of apparatus illustrated in Figures 1, 2 and 3 of the drawings.

In lieu of the cutter 72, a cutter-blade 83 as shown in Figure 9, provided with a hub-portion 84, and a cutting edge 85, may be employed. This form of cutter is also provided with a marginal rib 86 upon which is adjustably secured, by means of a set-screw 87, a weight or counterbalance 88.

I am also aware, that instead of the rotary cutter 44, I may use a cutter 89 of the form shown in Figure 10 of the drawings, which is provided with an eccentrically disposed hub 90, so that it can be mounted upon the shaft 43, or upon the rod 70 in connection with the post 64, for use with either forms of apparatus illustrated in said Figures 1, 2 and 3, or in Figure 4 of the drawings.

Of course I am aware that other changes may be made in the general arrangements and combinations of the various devices and parts, as well as in the details of the construction of the said parts, without departing from the scope of the present invention, as set forth in the foregoing specification, and as defined in the clauses of the claims which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A roll-cutting apparatus comprising a main frame, a conveyor movably disposed in said frame, a guide plate in said frame at one side of said conveyor, a spool above said conveyor for maintaining the roll upon the conveyor against said guide-plate, and a cutter disposed above and movable in a direction toward said conveyor for producing cuts of selective depths.

2. A roll-cutting apparatus comprising a main frame, a conveyor movably disposed in said frame, a guide plate in said frame at one side of said conveyor, a spring-controlled spool above said conveyor for maintaining the roll upon the conveyor against said guide-plate, and a cutter disposed above and movable in a direction toward said conveyor for producing cuts of selective depths.

3. A roll-cutting apparatus comprising a main frame, a conveyor movably disposed in said frame, said conveyor consisting of pivotally connected links, roll-engaging means extending from the links for retaining the rolls in place upon the conveyor, a guide-plate in said frame at one side of said conveyor, a spool above said conveyor for maintaining the roll upon the conveyor against said guide-plate, and a cutter disposed above and movable in a direction toward said conveyor for producing cuts of selective depths.

4. A roll-cutting apparatus comprising a main frame, a conveyor movably disposed in said frame, said conveyor consisting of pivotally connected links, roll-engaging means extending from the links for retaining the rolls in place upon the conveyor, a guide-plate in said frame at one side of said conveyor, a spring-controlled spool above said conveyor for maintaining the roll upon the conveyor against said guide-plate, and a cutter disposed above and movable in a direction toward said conveyor for producing cuts of selective depths.

5. A roll-cutting apparatus comprising a main frame, a conveyor movably disposed in said frame, a guide-plate in said frame at one side of said conveyor, a spool above said conveyor for maintaining the roll upon the conveyor against said guide-plate, a rotary cutter disposed above said conveyor, means for moving said cutter in a direction toward the conveyor, and means for rotating the cutter.

6. A roll-cutting apparatus comprising a main frame, a conveyor movably disposed in said frame, a guide-plate in said frame at one side of said conveyor, a spring-controlled spool above said conveyor for maintaining the roll upon the conveyor against said guide-plate, a rotary cutter disposed above said conveyor, means for moving said cutter in a direction toward the conveyor, and means for rotating the cutter.

7. A roll-cutting apparatus comprising a main frame, a conveyor movably disposed in said frame, said conveyor consisting of pivotally connected links, roll-engaging means extending from the links for retaining the rolls in place upon the conveyor, a guide-plate in said frame at one side of said conveyor, a spool above said conveyor for maintaining the roll upon the conveyor against said guide-plate, a rotary cutter disposed above said conveyor, means for moving said cutter in a direction toward the conveyor, and means for rotating the cutter.

8. A roll-cutting apparatus comprising a main frame, a conveyor movably disposed in said frame, said conveyor consisting of pivotally connected links, roll-engaging means extending from the links for retaining the rolls in place upon the conveyor, a guide-plate in said frame at one side of said conveyor, a spring-controlled spool above said conveyor for maintaining the roll upon the conveyor against said guide-plate, a rotary cutter disposed above said conveyor, means for moving said cutter in a direction toward the conveyor, and means for rotating the cutter.

9. A roll-cutting apparatus comprising a pair of side frames provided at their respective ends with bearing-portions, a supporting plate mounted between said frames, shafts journalled in the bearing-portions at the respective ends of the said frames, hubs upon said shafts, a conveyor mounted over said hubs, means upon said hubs in engagement with the conveyor so as to produce movement of the conveyor, means for actuation of one of said shafts, a pair of arms loosely mounted upon said last-mentioned shaft, said arms being provided with bearing-hubs, a spindle rotatably mounted in said hubs, a rotary cutter mounted upon said spindle, means upon said spindle in engagement with said shaft-actuating means for actuating said spindle, a lever pivotally attached at one end to one of the side-frames of the apparatus, and a means of connection between said arms and the lever, for moving the cutter in a direction toward the conveyor.

10. A roll-cutting apparatus comprising a pair of side-frames provided at their respective ends with bearing-portions, a supporting plate mounted between said frames, shafts journalled in the bearing-portions at the respective ends of the said frames, hubs upon said shafts, a conveyor mounted over said hubs, means upon said hubs in engagement with the conveyor so as to produce movement of the conveyor, means for actuation of one of said shafts, a pair of arms loosely mounted upon said last-mentioned shaft, said arms being provided with bearing-hubs, a spindle rotatably mounted in said hubs, a rotary cutter mounted upon said spindle, means upon said spindle in engagement with said shaft-actuating means for actuating said spindle, a lever pivotally attached at one end to one of the side-frames of the apparatus, and a means of connection between said arms and the lever, for moving the cutter in a direction toward the conveyor, combined with a guide-plate mounted upon said side-frame, an arm extending from said lever, a stem extending laterally from said last-mentioned arm, and a spring-controlled spool upon said stem for maintaining the roll upon the conveyor against said side-plate.

11. A roll-cutting apparatus comprising a pair of side frames provided at their respective ends with bearing-portions, a supporting plate mounted between said frames, shafts journaled in the bearing-portions at the respective ends of the said frames, hubs upon said shafts, a conveyor mounted over said hubs, means upon said hubs in engagement with the conveyor so as to produce movement of the conveyor, means for actuation of one of said shafts, a pair of arms loosely mounted upon said last-mentioned shaft, said arms being provided with bearing hubs, a spindle rotatably mounted in said hubs, a rotary cutter mounted upon said spindle, means upon said spindle in engagement with said shaft-actuating means for actuating said spindle, a lever pivotally attached at one end to one of the side-frames of the apparatus, and a means of connection between said arms and the lever, for moving the cutter in a direction toward the conveyor, combined with a guide-plate mounted upon said side-frame, an arm extending from said lever, a stem extending laterally from said last-mentioned arm, a spool upon said stem, a spring encircling said stem and in engagement with the spool for maintaining the roll upon the conveyor against said side-plate, and a second spring between said stem and the side-frame, for maintaining a pull upon said stem in a direction toward the upper edge of said guide-plate.

12. A roll-cutting apparatus comprising a pair of side-frames provided at their respective ends with bearing-portions, a supporting plate mounted between said frames, shafts journalled in the bearing-portions at the respective ends of the said frames, hubs upon said shafts, a conveyor mounted upon said hubs, means upon said hubs in engagement with the conveyor so as to produce movement of the conveyor, a gear-wheel mounted upon one of said shafts for actuation of said shaft, a pair of arms loosely mounted upon said last-mentioned shaft, said arms being provided with bearing-hubs, a spindle rotatably mounted in said hubs, a rotary cutter mounted upon said spindle, a pinion upon said spindle in mesh with said gear-wheel for actuating said spindle, a lever pivotally attached at one end to one of the side-frames of the apparatus, and means of connection between said arms and the lever, for moving the cutter in a direction toward the conveyor.

13. A roll-cutting apparatus comprising a pair of side-frames provided at their respective ends with bearing-portions, a supporting plate mounted between said frames, shafts journalled in the bearing-portions at the respective ends of the said frames, hubs upon said shafts, a conveyor mounted upon said hubs, means upon said hubs in engagement with the conveyor so as to produce movement of the conveyor, a gear-wheel mounted upon one of said shafts for actuation of said shaft, a pair of arms loosely mounted upon said last-mentioned shaft, said arms being provided with bearing-hubs, a spindle rotatably mounted in said hubs, a rotary cutter mounted upon said spindle, a pinion upon said spindle in mesh with said gear-wheel for actuating said spindle, a lever pivotally attached at one end to one of the side-frames of the apparatus, and a means of connection between said arms and the lever, for moving the cutter in a direction toward the conveyor, combined with a guide-plate mounted upon said side-frame, an arm extending from said lever, a stem extending laterally from said last-mentioned arm, and a spring-controlled spool upon said stem for maintaining the roll upon the conveyor against said side-plate.

14. A roll-cutting apparatus comprising a pair of side-frames provided at their respective ends with bearing-portions, a supporting plate mounted between said frames, shafts journalled in the bearing-portions at the respective ends of the said frames, hubs upon said shafts, a conveyor mounted upon said hubs, means upon said hubs in engagement with the conveyor so as to produce movement of the conveyor, a gear-wheel mounted upon one of said shafts for actuation of said shaft, a pair of arms loosely mounted upon said last-mentioned shaft, said arms being provided with bearing-hubs, a spindle rotatably mounted in said hubs, a rotary cutter mounted upon said spindle, a pinion upon said spindle in mesh with said gear-wheel for actuating said spindle, a lever pivotally attached at one end to one of the side-frames of the apparatus, and a means of connection between said arms and the lever, for moving the cutter in a direction toward the conveyor, combined with a guide-plate mounted upon said side-frame, an arm extending from said lever, a stem extending laterally from said last-mentioned arm, a spool upon said stem, a spring encircling said stem and in engagement with the spool for maintaining the roll upon the conveyor against said side-plate, and a second spring between said stem and the side-frame, for maintaining a pull upon said stem in a direction toward the upper edge of said guide-plate.

In testimony, that I claim the invention set forth above I have hereunto set my hand this 1st day of November, 1923.

EDWARD THEOBALD.

Witnesses:
　FREDK. C. FRAENTZEL,
　EVA E. DESCH.